US011251672B2

(12) United States Patent
Okuhata et al.

(10) Patent No.: US 11,251,672 B2
(45) Date of Patent: Feb. 15, 2022

(54) MOTOR

(71) Applicant: NIDEC CORPORATION, Kyoto (JP)

(72) Inventors: Yoshihisa Okuhata, Kanagawa (JP); Kunihiro Kajita, Kanagawa (JP); Mika Konagaya, Kanagawa (JP); Yosuke Ito, Kanagawa (JP)

(73) Assignee: NIDEC CORPORATION, Kyoto (JP)

( * ) Notice: Subject to any disclaimer, the term of this patent is extended or adjusted under 35 U.S.C. 154(b) by 93 days.

(21) Appl. No.: 16/631,897

(22) PCT Filed: Jul. 25, 2018

(86) PCT No.: PCT/JP2018/027814
§ 371 (c)(1),
(2) Date: Jan. 17, 2020

(87) PCT Pub. No.: WO2019/022110
PCT Pub. Date: Jan. 31, 2019

(65) Prior Publication Data
US 2020/0161922 A1   May 21, 2020

(30) Foreign Application Priority Data

Jul. 28, 2017 (JP) .............................. JP2017-147114

(51) Int. Cl.
*H02K 5/04* (2006.01)
*H02K 5/22* (2006.01)
(Continued)

(52) U.S. Cl.
CPC ................ *H02K 5/04* (2013.01); *H02K 3/50* (2013.01); *H02K 5/00* (2013.01); *H02K 5/20* (2013.01); *H02K 5/225* (2013.01); *H02K 11/33* (2016.01)

(58) Field of Classification Search
CPC ............ H02K 3/50; H02K 5/10; H02K 24/00; H02K 11/215; H02K 11/0094; H02K 5/20;
(Continued)

(56) References Cited

U.S. PATENT DOCUMENTS

| | | | |
|---|---|---|---|
| 2010/0084933 A1* | 4/2010 | Ishikawa ................ | F01C 21/10 310/89 |
| 2010/0209266 A1* | 8/2010 | Ikeda .................... | F04C 29/047 417/410.1 |

(Continued)

FOREIGN PATENT DOCUMENTS

| | | |
|---|---|---|
| JP | S54-28008 U | 2/1979 |
| JP | H3-139137 A | 6/1991 |
| JP | 2008-29127 A | 2/2008 |
| JP | 2012-222983 A | 11/2012 |

*Primary Examiner* — Quyen P Leung
*Assistant Examiner* — Alexander A Singh
(74) *Attorney, Agent, or Firm* — Hauptman Ham, LLP

(57) ABSTRACT

A motor including a rotor, a stator, an inverter, a housing, and a cover member. The housing is a single member that includes: a stator housing portion; an inverter housing portion housing the inverter; and a partition wall located between the stator housing portion and the inverter housing portion. The housing opening through which at least a part of the stator, an end on one side in an axial direction of the partition wall, and at least a part of the inverter housing portion are exposed is provided at an end on the one side in the axial direction of the housing. A three-phase coil wire extending from the stator passes through the end of the partition wall to the inverter, extends up to the inverter, and is connected to a connector terminal provided at an end on the one side in the axial direction of the inverter.

16 Claims, 5 Drawing Sheets

(51) Int. Cl.
*H02K 5/20* (2006.01)
*H02K 11/33* (2016.01)
*H02K 3/50* (2006.01)
*H02K 5/00* (2006.01)

(58) Field of Classification Search
CPC .......... H02K 9/19; H02K 11/30; H02K 11/33; H02K 5/225; H02K 11/00; H02K 11/38; H02K 5/00; H02K 5/22; H02K 2203/09; H02K 5/02; H02K 5/04; H02P 27/06; H02P 27/04
USPC .................................. 310/68 R, 71, 89, 68 D
See application file for complete search history.

(56) References Cited

U.S. PATENT DOCUMENTS

| | | | |
|---|---|---|---|
| 2011/0243769 A1* | 10/2011 | Yamada | H01R 13/627 417/410.1 |
| 2013/0119834 A1* | 5/2013 | Nakagami | F04C 23/008 310/68 D |
| 2013/0241458 A1* | 9/2013 | Soma | H02K 11/33 318/495 |
| 2015/0061422 A1 | 3/2015 | Nagao et al. | |
| 2016/0204529 A1* | 7/2016 | Imai | H01R 9/2425 439/587 |

\* cited by examiner

MOTOR

CROSS-REFERENCE TO RELATED APPLICATIONS

This is the U.S. national stage of application No. PCT/JP2018/027814, filed on Jul. 25, 2018, and priority under 35 U.S.C. § 119(a) and 35 U.S.C. § 365(b) is claimed from Japanese Application No. 2017-147114, filed on Jul. 28, 2017.

FIELD OF THE INVENTION

The present invention relates to a motor.

BACKGROUND

As a motor drive device for a vehicle, there is known a motor drive device in which an inverter is attached to a housing of a motor.

When the motor and the inverter are integrated, the motor and the inverter are electrically connected inside the housing. Conventionally, the motor and the inverter are electrically connected using a bus bar and a connector. Therefore, the number of parts increases, and a dedicated bus bar is required for each model.

SUMMARY

According to one aspect of the invention, provided is a motor including: a rotor having a motor shaft arranged along a central axis that extends in one direction; a stator opposing the rotor with a gap in a radial direction; an inverter electrically connected to the stator; a housing housing the stator and the inverter; and a cover member covering a housing opening. The housing is a single member that includes: a stator housing portion housing the stator; an inverter housing portion located on a radially outer side of the stator housing portion and housing the inverter; and a partition wall located between the stator housing portion and the inverter housing portion. The housing opening through which at least a part of the stator, an end on one side in an axial direction of the partition wall, and at least a part of the inverter housing portion are exposed is provided at an end on the one side in the axial direction of the housing. A three-phase coil wire extending from the stator passes through the end of the partition wall to the inverter, extends up to the inverter, and is connected to a connector terminal provided at an end on the one side in the axial direction of the inverter.

The above and other elements, features, steps, characteristics and advantages of the present disclosure will become more apparent from the following detailed description of the preferred embodiments with reference to the attached drawings.

DETAILED DESCRIPTION

Figure 1:
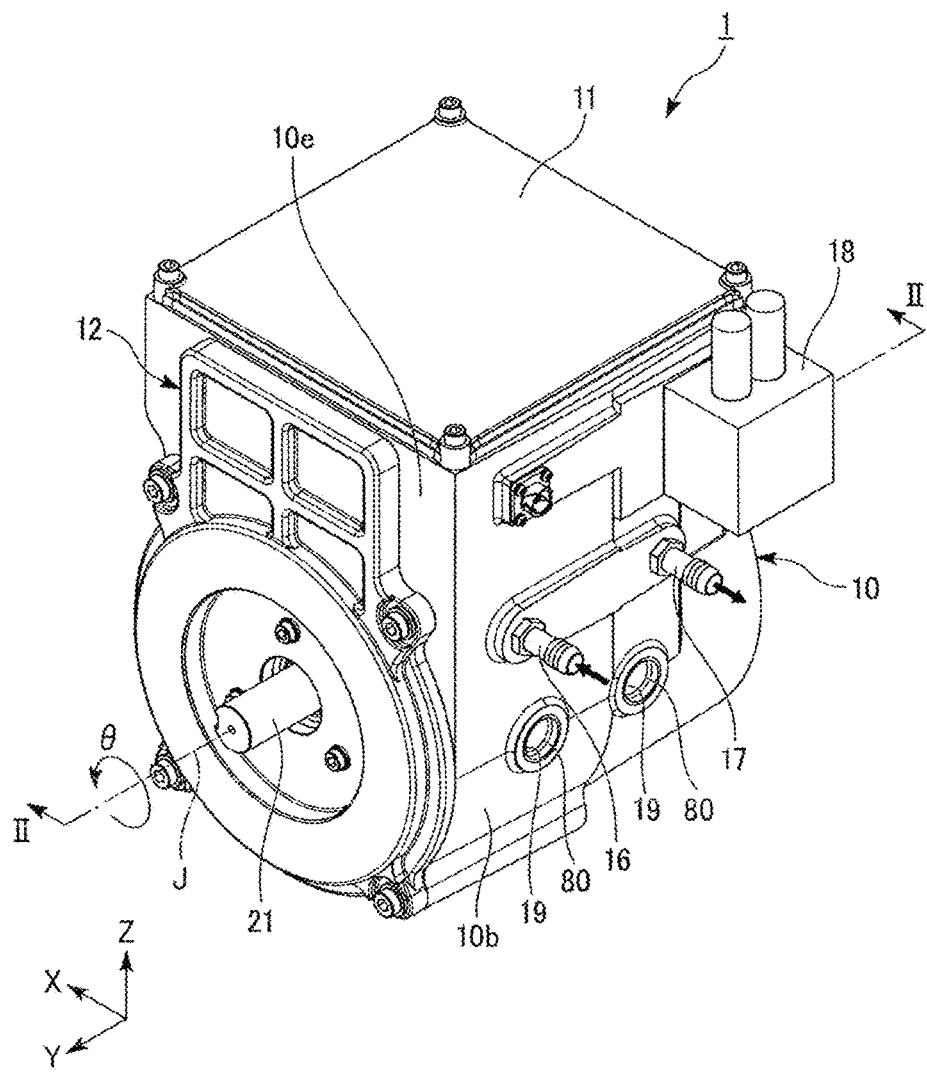
FIG. 1 is a perspective view illustrating a motor according to the present invention.

A Z-axis direction illustrated in each drawing is a vertical direction Z in which a positive side is an upper side and a negative side is a lower side. A Y-axis direction is a direction parallel to a central axis J extending in one direction illustrated in each drawing and is a direction orthogonal to the vertical direction Z. In the following description, the direction parallel to the central axis J, that is, the Y-axis direction will be simply referred to as an "axial direction Y". In addition, a positive side in the axial direction Y will be referred to as "one side in the axial direction", and a negative side in the axial direction Y will be referred to as the "other side in the axial direction". The X-axis direction illustrated in each drawing is a direction orthogonal to both the axial direction Y and the vertical direction Z. In the following description, the X-axis direction will be referred to as a "width direction X". In addition, a positive side in the width direction X will be referred to as "one side in the width direction", and a negative side in the width direction X will be referred to as the "other side in the width direction". In the present embodiment, the vertical direction Z corresponds to a predetermined direction.

In addition, a radial direction about the central axis J will be simply referred to as the "radial direction", and a circumferential direction about the central axis J will be simply referred to as a "circumferential direction θ". In addition, in the circumferential direction θ, a side proceeding clockwise, that is, the side on which an arrow indicating the circumferential direction θ in the drawing proceeds will be referred to as "one side in the circumferential direction", and a side proceeding counterclockwise, that is, the side opposite to the side on which the arrow indicating the circumferential direction θ in the drawing proceeds will be referred to as "the other side in the circumferential direction" as viewed from the other side in the axial direction toward the one side in the axial direction.

Note that the vertical direction, the upper side, and the lower side are simply names for describing a relative positional relationship of each portion, and an actual arrangement relationship or the like may be an arrangement relationship other than the arrangement relationship indicated by these names.

Figure 2:
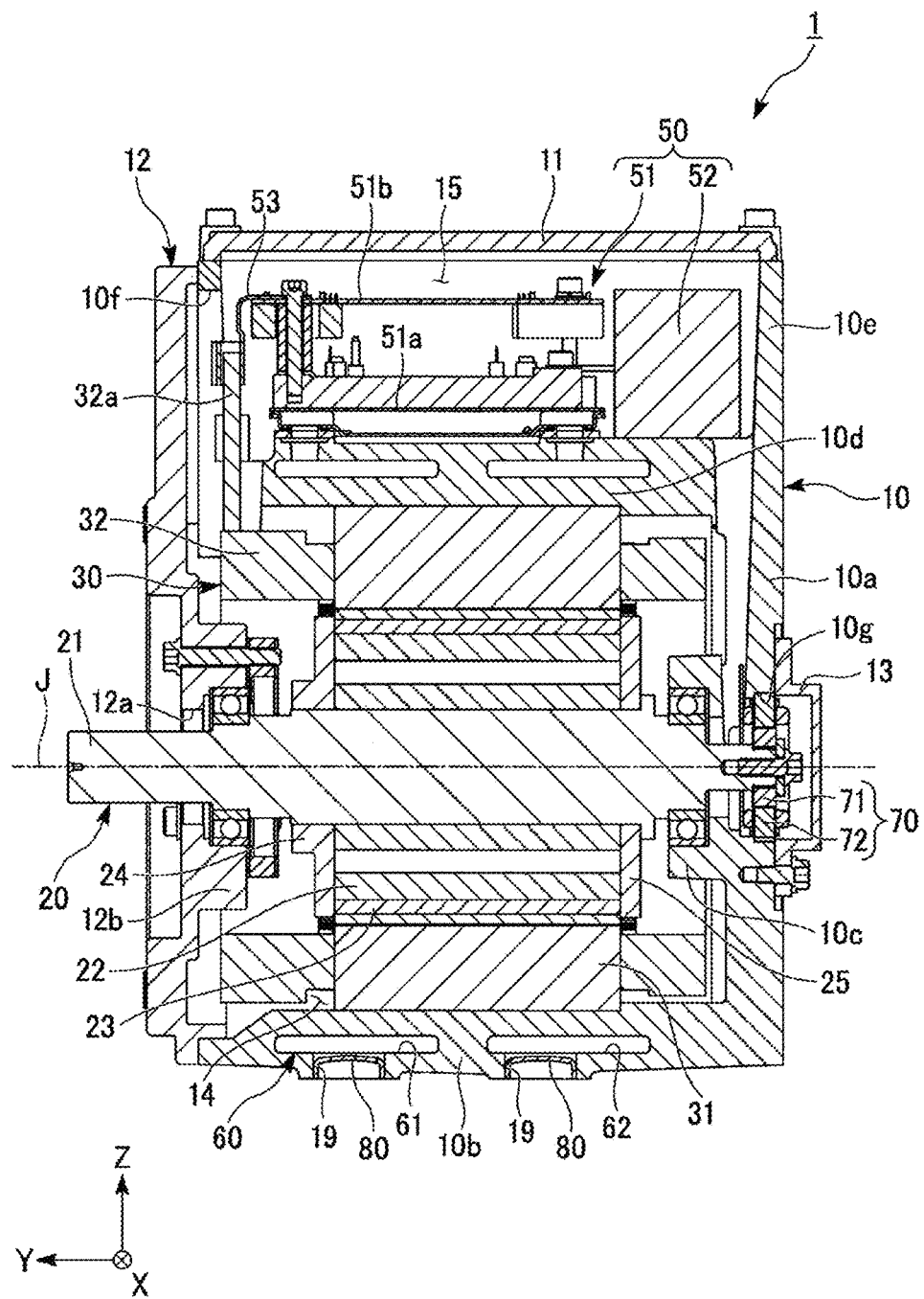
FIG. 2 is a view illustrating the motor according to the present embodiment and is a cross-sectional view taken along line II-II of FIG. 1.

As illustrated in FIGS. 1 and 2, a motor 1 of the present embodiment includes a housing 10, a lid 11, a cover member 12, a sensor cover 13, a rotor 20 having a motor shaft 21 arranged along the central axis J, a stator 30, an inverter unit 50, a connector 18, and a rotation detection unit 70.

As illustrated in FIG. 2, the housing 10 houses the rotor 20, the stator 30, the rotation detection unit 70, and the inverter unit 50. The housing 10 is a single member. The housing 10 is manufactured by sand casting, for example. The housing 10 includes a circumferential wall 10b, a bottom wall 10a, a bearing holding portion 10c, and a rectangular tube portion 10e.

The circumferential wall 10b has a tubular shape surrounding the rotor 20 and the stator 30 on the radially outer side of the rotor 20 and the stator 30. In the present embodiment, the circumferential wall 10b has a substantially cylindrical shape centered on the central axis J. The circumferential wall 10b is open on the one side in the axial direction. The circumferential wall 10b has a cooling unit 60 that cools the stator 30 and the inverter unit 50.

The bottom wall 10a is provided at an end on the other side in the axial direction of the circumferential wall 10b. The bottom wall 10a closes the other side in the axial direction of the circumferential wall 10b. The bottom wall 10a has a sensor housing portion 10g that penetrates the bottom wall 10a in the axial direction Y. The sensor housing portion 10g has a circular shape centered on the central axis J, for example, as viewed along the axial direction Y. The bottom wall 10a and the circumferential wall 10b constitute a stator housing portion 14. That is, the housing 10 has the bottomed tubular stator housing portion 14 having the circumferential wall 10b and the bottom wall 10a.

The bearing holding portion 10c has a cylindrical shape protruding from a circumferential edge of the sensor housing portion 10g on a surface on the one side in the axial direction of the bottom wall 10a to the one side in the axial direction. The bearing holding portion 10c holds a bearing that supports the motor shaft 21 on the other side in the axial direction of a rotor core 22 to be described later.

As illustrated in FIGS. 1 and 2, the rectangular tube portion 10e has a rectangular tube shape extending upward from the circumferential wall 10b. The rectangular tube portion 10e is open upward. In the present embodiment, the rectangular tube portion 10e has, for example, a square tube shape. As illustrated in FIG. 2, a wall on the other side in the axial direction among walls constituting the rectangular tube portion 10e is connected to an upper end of the bottom wall 10a. The rectangular tube portion 10e has a through-hole 10f that penetrates a wall on the one side in the axial direction among the walls constituting the rectangular tube portion 10e in the axial direction Y. A lower end of the through-hole 10f is connected to an opening on the one side in the axial direction of the circumferential wall 10b. The through-hole 10f and the opening on the one side in the axial direction of the circumferential wall 10b constitute a housing opening 10A. The rectangular tube portion 10e and the circumferential wall 10b constitute an inverter housing portion 15. That is, the housing 10 has the inverter housing portion 15.

The inverter housing portion 15 is located on the radially outer side of the stator housing portion 14. In the present embodiment, the inverter housing portion 15 is located above the stator housing portion 14 in the vertical direction Z orthogonal to the axial direction Y. The stator housing portion 14 and the inverter housing portion 15 are partitioned in the vertical direction Z by a partition wall 10d. The partition wall 10d is an upper portion of the circumferential wall 10b. That is, the circumferential wall 10b includes the partition wall 10d that partitions the stator housing portion 14 and the inverter housing portion 15.

Figure 3:
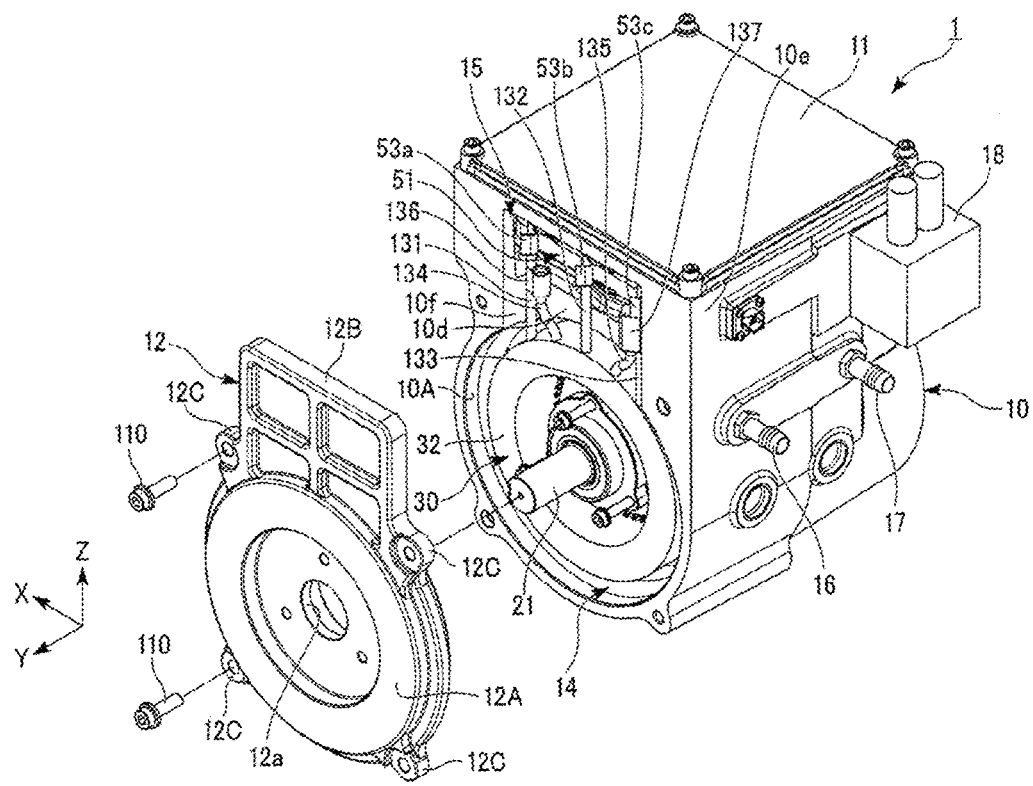
FIG. 3 is a perspective view illustrating a state where a cover member has been detached.

The lid 11 illustrated in FIG. 2 has a plate shape whose plate surface is orthogonal to the vertical direction Z. The lid 11 is fixed to an upper end of the rectangular tube portion 10e. The lid 11 closes an upper opening of the rectangular tube portion 10e. As illustrated in FIGS. 1 to 3, the cover member 12 has a plate shape whose plate surface is orthogonal to the axial direction Y. The cover member 12 is fixed to surfaces on the one side in the axial direction of the circumferential wall 10b and the rectangular tube portion 10e. The cover member 12 closes the housing opening 10A.

As illustrated in FIGS. 2 and 3, the cover member 12 includes a disk-shaped stator cover 12A and a rectangular inverter cover 12B extending upward from the stator cover 12A. The stator cover 12A closes the opening on the one side in the axial direction of the circumferential wall 10b. The inverter cover 12B closes the through-hole 10f.

The cover member 12 has an output shaft hole 12a that penetrates the stator cover 12A in the axial direction Y. The output shaft hole 12a has, for example, a circular shape that passes through the central axis J. The cover member 12 includes a bearing holding portion 12b that protrudes from a circumferential edge of the output shaft hole 12a on a surface on the other side in the axial direction of the stator cover 12A to the other side in the axial direction. The bearing holding portion 12b holds a bearing that supports the motor shaft 21 on the one side in the axial direction of the rotor core 22 to be described later. The cover member 12 has four fixing portions 12C that protrude to the radially outer side from an outer circumferential edge of the stator cover 12A. The cover member 12 has through-holes that penetrate the respective fixing portions 12C in the axial direction Y. The cover member 12 is fastened to the housing 10 by four bolts 110 passing through the through-holes of the four fixing portions 12C.

The sensor cover 13 is fixed to a surface on the other side in the axial direction of the bottom wall 10a. The sensor cover 13 covers and closes an opening on the other side in the axial direction of the sensor housing portion 10g. The sensor cover 13 covers the rotation detection unit 70 from the other side in the axial direction.

The rotor 20 includes the motor shaft 21, includes rotor core 22, a magnet 23, a first end plate 24, and a second end plate 25. The motor shaft 21 is rotatably supported by the bearings on both sides in the axial direction. An end on the one side in the axial direction of the motor shaft 21 protrudes from the opening on the one side in the axial direction of the circumferential wall 10b toward the one side in the axial direction. The end on the one side in the axial direction of the motor shaft 21 passes through the output shaft hole 12a and protrudes to the one side in the axial direction from the cover member 12. An end on the other side in the axial direction of the motor shaft 21 is inserted into the sensor housing portion 10g.

The rotor core 22 is fixed to an outer circumferential surface of the motor shaft 21. The magnet 23 is inserted into a hole that penetrates the rotor core 22 provided in the rotor core 22 in the axial direction Y. The first end plate 24 and the second end plate 25 have an annular plate shape that expands in the radial direction. The first end plate 24 and the second end plate 25 sandwich the rotor core 22 in the axial direction Y in the state of being in contact with the rotor core 22. The first end plate 24 and the second end plate 25 press the magnet 23, which has been inserted into the hole of the rotor core 22, from both sides in the axial direction.

The stator 30 opposes the rotor 20 with a gap in the radial direction. The stator 30 includes a stator core 31 and a plurality of coils 32 attached to the stator core 31. The stator core 31 has an annular shape centered on the central axis J. An outer circumferential surface of the stator core 31 is fixed to an inner circumferential surface of the circumferential wall 10b. The stator core 31 opposes the outer side in the radial direction of the rotor core 22 with a gap.

The inverter unit 50 controls power to be supplied to the stator 30. The inverter unit 50 includes an inverter 51 and a capacitor 52. That is, the motor 1 includes an inverter 51 and a capacitor 52. The inverter 51 is housed in the inverter housing portion 15. The inverter 51 includes a first circuit board 51a and a second circuit board 51b. The first circuit board 51a and the second circuit board 51b have a plate shape whose plate surface is orthogonal to the vertical direction Z. The second circuit board 51b is arranged to be separated from the first circuit board 51a. The first circuit board 51a and the second circuit board 51b are electrically connected. A coil wire 32a is connected to the first circuit board 51a via a connector terminal 53. As a result, the inverter 51 is electrically connected to the stator 30. Incidentally, the "coil wire 32*a*" is a general term for a plurality of coil wires which are led out from the coil 32 and extend to the inverter 51 in the present specification. In addition, the "connector terminal 53" is a general term for a plurality of connector terminals which are connected to the coil wire in the inverter 51.

As illustrated in FIG. 3, at least a part of the stator 30, the end on the one side in the axial direction of the partition wall 10*d*, and at least a part of the inverter housing portion 15 are exposed through the housing opening 10A of the housing 10. On the inner side of the housing opening 10A, three-phase wiring bundles 131, 132, and 133 extending from the stator 30 extend up to the inverter 51 through the end of the partition wall 10*d* and are connected to connector terminals 53*a*, 53*b*, and 53*c* located at an end on the one side in the axial direction of the inverter 51.

Figure 5:
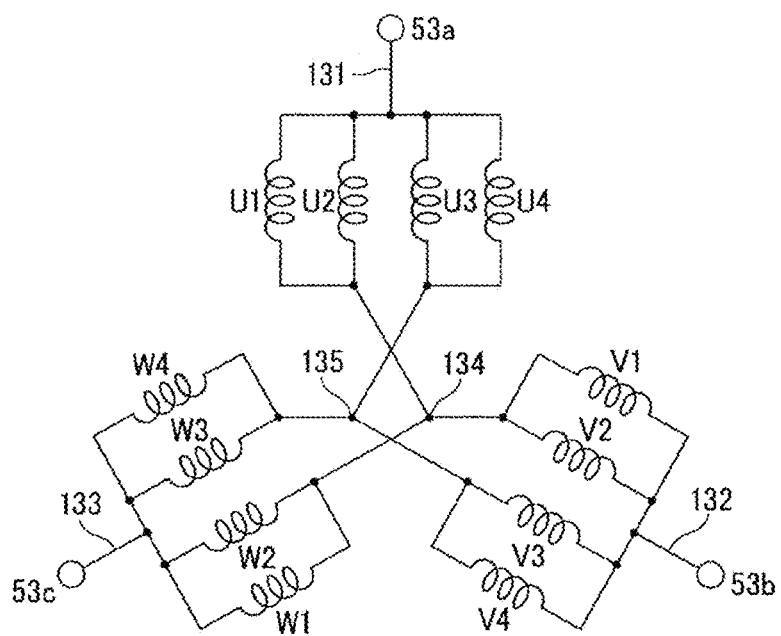
FIG. 5 is a circuit diagram of a coil.

The star connection illustrated in FIG. 5 is used for the coil 32 of the present embodiment. The three-phase wiring bundle 131 is a wiring bundle in which three-phase coil wires led out from a plurality of U-phase coils U1 to U4 illustrated in FIG. 5 are bundled, and is constituted by, for example, four coil wires. The three-phase wiring bundle 132 is a wiring bundle in which three-phase coil wires led out from a plurality of V-phase coils V1 to V4 are bundled, and is constituted by, for example, four coil wires. The three-phase wiring bundle 133 is a wiring bundle in which three-phase coil wires led out from a plurality of W-phase coils W1 to W4 are bundled, and is constituted by, for example, four coil wires. Therefore, the three-phase coil wires extending from the stator 30 extend up to the inverter 51 through the end of the partition wall 10*d* and are connected to the connector terminals 53*a* to 53*c* in the present embodiment.

According to the above configuration, the three-phase wiring bundles 131 to 133 led out from the stator 30 are directly connected to the inverter 51. As a result, a bus bar for connection is unnecessary, and the number of parts can be reduced. In addition, the stator 30 and the inverter 51 can be electrically connected in the single housing opening 10A, the assembly workability is also excellent. Since the housing opening 10A is closed by the single cover member 12, the structures of the housing 10 and the cover member 12 can be simplified.

In the present embodiment, the three three-phase wiring bundles 131 to 133, obtained by bundling the plurality of coil wires for the U phase, the V phase, and the W phase, respectively, are led out from the stator 30 and connected to the inverter 51. With the configuration in which the wiring bundles are connected in this manner, the connector terminals of the inverter 51 can be reduced, and the connection work becomes easy. In addition, it is easy to ensure the insulation of the coil wire 32*a* with this configuration.

Figure 4:
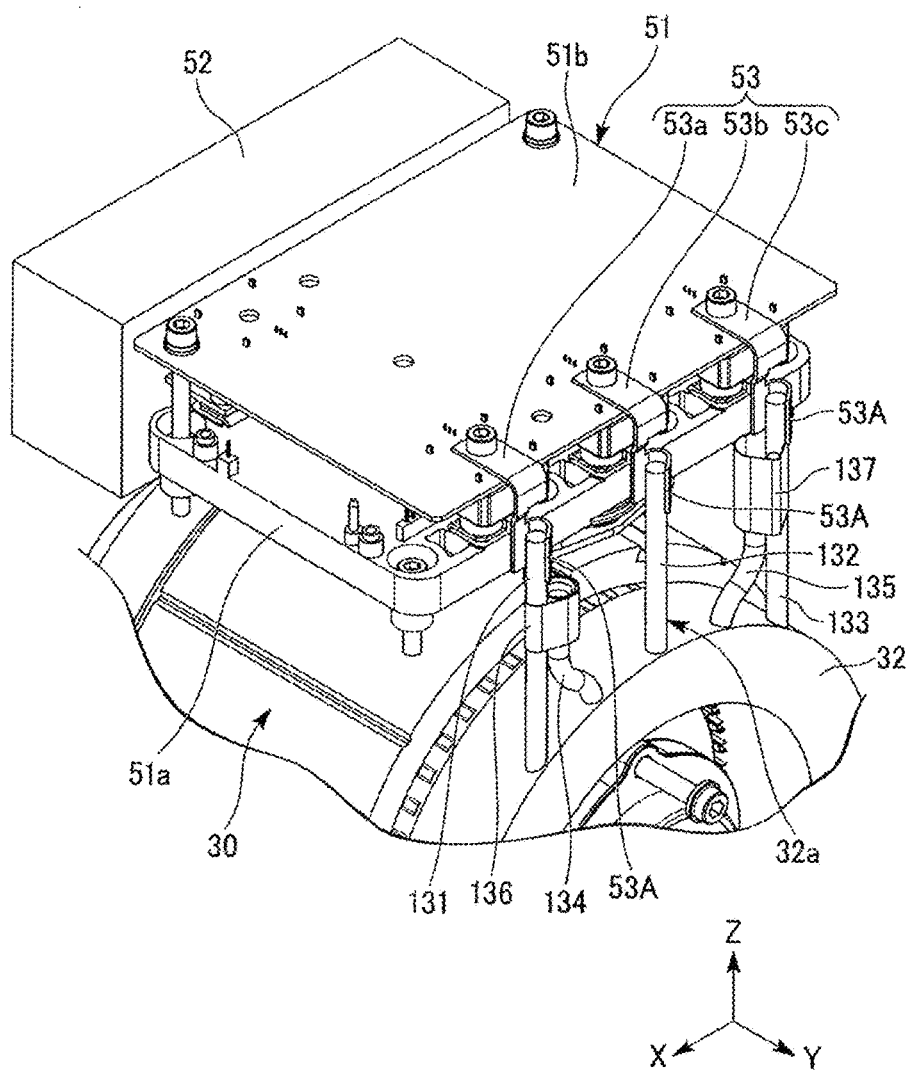
FIG. 4 is a perspective view illustrating a connection portion between an inverter and a coil wire.

FIG. 4 is a perspective view illustrating a connection mode between the stator 30 and the inverter 51. FIG. 4 does not illustrate the housing 10, the lid 11, and the cover member 12. As illustrated in FIG. 4, the connector terminals 53*a* to 53*c* to which the three-phase wiring bundles 131 to 133 are connected are caulked and fixed to a grip portion 53A. That is, the connector terminals 53*a* to 53*c* are crimp terminals. With this configuration, a worker can efficiently and easily perform the work of fixing the three-phase wiring bundles 131 to 133. The three-phase wiring bundles 131 to 133 may be welded to the connector terminals 53*a* to 53*c*.

As illustrated in FIGS. 3 and 4, the stator 30 has two neutral wiring bundles 134 and 135 extending upward from the coil 32. As illustrated in FIG. 5, the neutral wiring bundle 134 is a wiring bundle in which neutral coil wires led out from the U-phase coils U1 and U2, the V-phase coils V1 and V2, and the W-phase coils W1 and W2 are bundled, and is constituted by, for example, six coil wires. The neutral wiring bundle 135 is a wiring bundle in which neutral coil wires led out from the U-phase coils U3 and U4, the V-phase coils V3 and V4, and the W-phase coils W3 and W4 are bundled, and is constituted by, for example, six coil wires.

The neutral wiring bundle 134 is fixed to a portion of the three-phase wiring bundle 131 between the connector terminal 53*a* and the coil 32 by an insulating tape 136. The neutral wiring bundle 135 is fixed to a portion of the three-phase wiring bundle 133 between the connector terminal 53*c* and the coil 32 by an insulating tape 137. An insulating member may be arranged between the wiring bundles fixed by the insulating tapes 136 and 137 in order to prevent a short-circuit between the three-phase wiring bundles 131 and 133 and the neutral wiring bundles 134 and 135. With the configuration in which the neutral wiring bundles 134 and 135 are fixed to the three-phase wiring bundles 131 and 133, the worker can easily fix the neutral wiring bundles 134 and 135 near the coil 32.

In the present embodiment, the neutral coil wires of the coil 32 are led out to be distributed equally to the two neutral wiring bundles 134 and 135. In addition, the two neutral wiring bundles 134 and 135 are fixed to the three-phase wiring bundles 131 and 133 located on both sides in the width direction X, respectively. With this configuration, lengths of the neutral coil wires extending from the large stator 30 can be made substantially uniform. Since the lengths of the neutral coil wires are made uniform, electrical characteristics of the U-phase coil, V-phase coil, and W-phase coil constituting the coil 32 can be made uniform. In addition, the fixing work is easily performed since the neutral wiring bundles 134 and 135 are fixed to the three-phase wiring bundles 131 and 133 at positions separated from each other.

In the present embodiment, the worker can easily fix the neutral wiring bundles 134 and 135 since the insulating tapes 136 and 137 are used for fixing the neutral wiring bundles 134 and 135. When adhesive insulating tapes are used as the insulating tapes 136 and 137, the neutral wiring bundles 134 and 135 can be more easily fixed.

The fixing positions of the neutral wiring bundles 134 and 135 are not limited to the three-phase wiring bundles 131 and 133, and can be appropriately changed inside the housing opening 10A. For example, the neutral wiring bundles 134 and 135 may be affixed to the end on the one side in the axial direction of the partition wall 10*d* using an insulating tape or the like. Alternatively, a configuration may be adopted in which a holding member such as a clip is arranged in the inverter 51 and the neutral wiring bundles 134 and 135 are held by the holding member. In any of the above configurations, the worker can efficiently and easily perform the work of arranging the neutral wiring bundles 134 and 135.

As illustrated in FIG. 2, the capacitor 52 has a rectangular parallelepiped shape that is long in the width direction X. The capacitor 52 is housed in the inverter housing portion 15. The capacitor 52 is arranged on the other side in the axial direction of the inverter 51. That is, the inverter 51 and the capacitor 52 are arranged side by side in the axial direction Y in the inverter housing portion 15. The capacitor 52 is electrically connected to the inverter 51. As illustrated in FIG. 2, the capacitor 52 is fixed to an upper surface of the partition wall 10*d*. The capacitor 52 is in contact with the partition wall 10*d*.

As illustrated in FIG. 1, the connector 18 is provided on a surface on the other side in the width direction of the rectangular tube portion 10e. An external power supply (not illustrated) is connected to the connector 18. Power is supplied to the inverter unit 50 from the external power supply connected to the connector 18.

The rotation detection unit 70 detects the rotation of the rotor 20. In the present embodiment, the rotation detection unit 70 is, for example, a variable reluctance (VR) resolver. As illustrated in FIG. 2, the rotation detection unit 70 is housed in the sensor housing portion 10g. That is, the rotation detection unit 70 is arranged on the bottom wall 10a. The rotation detection unit 70 includes a detected portion 71 and a sensor unit 72.

The detected portion 71 has an annular shape extending in the circumferential direction. The detected portion 71 is fitted and fixed to the motor shaft 21. The detected portion 71 is made of a magnetic material. The sensor unit 72 has an annular shape that surrounds the radially outer side of the detected portion 71. The sensor part 72 is fitted into the sensor housing portion 10g. The sensor unit 72 is supported by the sensor cover 13 from the other side in the axial direction. That is, the sensor cover 13 supports the rotation detection unit 70 from the other side in the axial direction. The sensor unit 72 has a plurality of coils along the circumferential direction.

Although not illustrated, the motor 1 further includes a sensor wiring that electrically connects the rotation detection unit 70 and the inverter 51. One end of the sensor wiring is connected to the detected portion 71. The sensor wiring is routed from the detected portion 71 to the inside of the inverter housing portion 15 through a through-hole that penetrates the inside of the bottom wall 10a and the partition wall 10d in the radial direction. The other end of the sensor wiring is connected to, for example, the first circuit board 51a.

When the detected portion 71 rotates together with the motor shaft 21, an induced voltage corresponding to a circumferential position of the detected portion 71 is generated in the coil of the sensor unit 72. The sensor unit 72 detects the rotation of the detected portion 71 by detecting the induced voltage. As a result, the rotation detection unit 70 detects the rotation of the rotor 20 by detecting the rotation of the motor shaft 21. The rotation information of the rotor 20 detected by the rotation detection unit 70 is sent to the inverter 51 via the sensor wiring.

In the present embodiment, the wiring of the sensor unit 72 passes through an inside of the housing 10 on the other side in the axial direction, but the connection between the three-phase wiring bundles 131 to 133 extending from the stator 30 and the inverter 51 is performed in an inside of the housing opening 10A located at the end on the one side in the axial direction of the housing 10.

In addition, when the stator 30 using no bus bar is attached to the stator housing portion 14, it is necessary to insert the stator 30 from the opening of the circumferential wall 10b toward the bottom wall 10a. That is, the stator 30 is inserted inside the circumferential wall 10b from the one side in the axial direction to the other side in the axial direction. In addition, the three-phase wiring bundles 131 to 133 are highly rigid wiring in the stator 30 that does not use a bus bar, and are not easily bent as the wiring of the sensor unit 72. Therefore, it is difficult to cause the three-phase wiring bundles 131 to 133 to pass through the vicinity of the bottom wall 10a.

Therefore, it is preferable to arrange the three-phase wiring bundles 131 to 133 on the opposite side of the wiring of the sensor unit 72 in the axial direction Y as in the present embodiment. As a result, it is possible to efficiently perform the work regarding the three-phase wiring bundles 131 to 133 on the inner side of the housing opening 10A having a wide opening and good workability. Then, the wiring of the sensor unit 72, which is relatively easy to route, but is thin and easily damaged, can be protected by routing the wiring on the inner side of the bottom wall 10a.

The cooling unit 60 includes an upstream cooling flow path 61 and a downstream cooling flow path 62 as a plurality of cooling flow paths. The coolant flows through the upstream cooling flow path 61 and the downstream cooling flow path 62. The coolant is not particularly limited as long as being a fluid that can cool the stator 30 and the inverter 51. The coolant may be water, a liquid other than water, or a gas.

The upstream cooling flow path 61 is connected to an inflow nozzle 16 illustrated in FIG. 1. The inflow nozzle 16 is inserted into a hole provided in the housing 10. The inflow nozzle 16 protrudes from the housing 10 to the other side in the width direction. The downstream cooling flow path 62 is connected to an outflow nozzle 17 illustrated in FIG. 1. The outflow nozzle 17 is inserted into a hole provided in the housing 10. The outflow nozzle 17 protrudes from the housing 10 to the other side in the width direction. The inflow nozzle 16 and the outflow nozzle 17 are arranged at the same position in the vertical direction Z. The inflow nozzle 16 and the outflow nozzle 17 are arranged with an interval in the axial direction Y.

At least a part of each of the upstream cooling flow path 61 and the downstream cooling flow path 62 is provided in the partition wall 10d. Therefore, the stator housing portion 14 and the inverter housing portion 15 partitioned by the partition wall 10d can be cooled by the coolant flowing through the upstream cooling flow path 61 and the downstream cooling flow path 62, and the stator 30 housed in the stator housing portion 14 and the inverter 51 housed in the inverter housing portion 15 can be cooled.

In the present embodiment, the cooling unit 60 is molded by a sand mold portion having the shape of the cooling unit 60 when the housing 10 is manufactured by sand casting. As illustrated in FIGS. 1 and 2, the housing 10 has a plurality of discharge holes 19 configured to discharge the sand mold molding the cooling unit 60. After the housing 10 is manufactured by the sand casting, the sand mold molding the cooling unit 60 is discharged from the discharge hole 19. The discharge hole 19 is connected to the cooling unit 60. A plug 80 is press-fitted into the discharge hole 19. The discharge hole 19 is closed by the plug 80, and it is possible to prevent the coolant inside the cooling unit 60 from leaking outside the housing 10.

An application of the motor according to the embodiment described above is not particularly limited. The motor of the embodiment described above is mounted on a vehicle, for example. In addition, the above-described respective configurations can be properly combined within a range in which no conflict occurs.

The present application claims the priority of Japanese Patent Application No. 2017-147114 filed on Jul. 28, 2017, the entire contents of which are hereby incorporated by reference.

The invention claimed is:

1. A motor comprising:
a rotor having a motor shaft arranged along a central axis that extends in an axial direction;
a stator opposing the rotor with a gap in a radial direction;
an inverter electrically connected to the stator;
a housing housing the stator and the inverter; and
a cover member covering a housing opening,
wherein the housing is a single member that includes:
   a stator housing portion housing the stator;
   an inverter housing portion located on a radially outer side of the stator housing portion and housing the inverter; and
   a partition wall located between the stator housing portion and the inverter housing portion,
the housing opening through which at least a part of the stator, an end on one side in an axial direction of the partition wall, and at least a part of the inverter housing portion are exposed is provided at an end on the one side in the axial direction of the housing,
the housing further includes a circumferential wall, a bottom wall and a rectangular tube portion,
the bottom wall is provided at an end on the other side in the axial direction of the circumferential wall,
the stator housing portion has the circumferential wall and the bottom wall,
the rectangular tube portion has a rectangular tube shape extending upward from the circumferential wall,
the inverter housing portion is constituted by the circumferential wall and the rectangular tube portion,
the rectangular tube portion has a through-hole that penetrates a wall on the one side in the axial direction among walls constituting the rectangular tube portion in the axial direction,
the circumferential wall is open on the one side in the axial direction,
a lower end of the through-hole is connected to an opening on the one side in the axial direction of the circumferential wall,
the housing opening is constituted by the through-hole and the opening on the one side in the axial direction of the circumferential wall, and
a three-phase coil wire extending from the stator passes through the end of the partition wall to the inverter, extends up to the inverter, and is connected to a connector terminal provided at an end on the one side in the axial direction of the inverter.

2. The motor according to claim 1, wherein
three three-phase wiring bundles in which a plurality of coil wires are bundled for each of a U phase, a V phase, and a W phase extend from the stator, and the three-phase wiring bundles are connected to the inverter.

3. The motor according to claim 2,
wherein a neutral wiring bundle in which a plurality of neutral coil wires are bundled extends from the stator, and the neutral wiring bundle is fixed to an internal region of the housing opening.

4. The motor according to claim 3, wherein
the neutral wiring bundle is fixed to the three-phase wiring bundle.

5. The motor according to of claim 4, wherein
the neutral wiring bundle is fixed by an insulating tape.

6. The motor according to claim 5, wherein
the connector terminal is a crimp terminal.

7. The motor according to claim 2, wherein
the connector terminal is a crimp terminal.

8. The motor according to claim 3, wherein
the neutral wiring bundle is fixed by an insulating tape.

9. The motor according to claim 8, wherein
the connector terminal is a crimp terminal.

10. The motor according to claim 3, wherein
the connector terminal is a crimp terminal.

11. The motor according to of claim 4, wherein
the connector terminal is a crimp terminal.

12. The motor according to claim 1, wherein
the connector terminal is a crimp terminal.

13. A motor, comprising:
a rotor having a motor shaft arranged along a central axis that extends in one direction;
a stator opposing the rotor with a gap in a radial direction;
an inverter electrically connected to the stator;
a housing housing the stator and the inverter; and
a cover member covering a housing opening,
wherein the housing is a single member that includes:
   a stator housing portion housing the stator;
   an inverter housing portion located on a radially outer side of the stator housing portion and housing the inverter; and
   a partition wall located between the stator housing portion and the inverter housing portion,
the housing opening through which at least a part of the stator, an end on one side in an axial direction of the partition wall, and at least a part of the inverter housing portion are exposed is provided at an end on the one side in the axial direction of the housing,
a three-phase coil wire extending from the stator passes through the end of the partition wall to the inverter, extends up to the inverter, and is connected to a connector terminal provided at an end on the one side in the axial direction of the inverter,
three three-phase wiring bundles in which a plurality of coil wires are bundled for each of a U phase, a V phase, and a W phase extend from the stator, and the three-phase wiring bundles are connected to the inverter, and
neutral wiring bundles in which a plurality of neutral coil wires are bundled extend from the stator, and the neutral wiring bundles are fixed to an internal region of the housing opening.

14. The motor according to claim 13, wherein
the neutral wiring bundles are fixed to the three-phase wiring bundle.

15. The motor according to claim 13, wherein
each of the neutral wiring bundles is fixed by an insulating tape.

16. The motor according to claim 13, wherein
the connector terminal is a crimp terminal.

* * * * *